(12) United States Patent
Bergman et al.

(10) Patent No.: US 11,668,427 B2
(45) Date of Patent: Jun. 6, 2023

(54) METHOD FOR REHABILITATING A PIPELINE WITH A LINER

(71) Applicant: MOCS CIPP B.V., Rotterdam (NL)

(72) Inventors: Anande Bergman, Delft (NL); Peter Madlener, Rotterdam (NL)

(73) Assignee: MOCS CIPP B.V., Rotterdam (NL)

( * ) Notice: Subject to any disclaimer, the term of this patent is extended or adjusted under 35 U.S.C. 154(b) by 242 days.

(21) Appl. No.: 17/291,637

(22) PCT Filed: Nov. 8, 2019

(86) PCT No.: PCT/NL2019/050732
§ 371 (c)(1),
(2) Date: May 6, 2021

(87) PCT Pub. No.: WO2020/096457
PCT Pub. Date: May 14, 2020

(65) Prior Publication Data
US 2022/0018482 A1 Jan. 20, 2022

(30) Foreign Application Priority Data
Nov. 9, 2018 (NL) ..................................... 2021972

(51) Int. Cl.
*F16L 55/165* (2006.01)
*F16L 1/10* (2006.01)
(52) U.S. Cl.
CPC .............. *F16L 55/1654* (2013.01); *F16L 1/10* (2013.01); *F16L 55/1656* (2013.01)

(58) Field of Classification Search
CPC . F16L 55/165; F16L 55/1652; F16L 55/1654; F16L 1/10; F16L 33/222;
(Continued)

(56) References Cited

U.S. PATENT DOCUMENTS

| 2,452,985 A | | 11/1948 | Bourdette |
| 4,496,499 A | * | 1/1985 | Brittain .................. B29C 63/34 |
| | | | 264/269 |

(Continued)

FOREIGN PATENT DOCUMENTS

WO 2018139923 A1 8/2018

OTHER PUBLICATIONS

International Search Report and Written Opinion for International Application Serial No. PCT/NL2019/050732, dated Jan. 29, 2020.

*Primary Examiner* — Patrick F Brinson
(74) *Attorney, Agent, or Firm* — KDW Firm PLLC

(57) ABSTRACT

A method for rehabilitating a pipeline with a liner includes providing a coupling member to connect a liner to a pipeline element. A first alignment element is connected to an end of the host pipe and a second alignment element to an end of the coupling member to axially align both components. A length of the liner is provided through the pipe and the coupling member to expose a joining section of the liner outside the pipe. The coupling member is brought towards the pipe such that the first and second alignment elements mate and the joining section of the liner is received in the coupling member. The joining section of the liner is pressurized to engage an interior surface of the coupling member, and a curable resin composition of the liner is cured to form a functional joint between the coupling member and the liner joining section.

22 Claims, 11 Drawing Sheets

(58) Field of Classification Search
CPC ....... B29C 63/346; B29C 63/26; B29C 63/34; B29C 66/1312
USPC ......... 138/98, 97; 264/267, 516, 269, 36.17; 285/55; 156/94, 287
See application file for complete search history.

(56) References Cited

U.S. PATENT DOCUMENTS

| | | | |
|---|---|---|---|
| 5,306,449 A * | 4/1994 | Brittain | B29C 66/5344 264/269 |
| 5,421,370 A * | 6/1995 | Marcout | F16L 55/18 138/155 |
| 2013/0160886 A1* | 6/2013 | Wright, Jr. | G01M 3/283 73/40.5 R |
| 2014/0333067 A1 | 11/2014 | Okabe et al. | |
| 2015/0174706 A1 | 6/2015 | McClure | |
| 2016/0348812 A1* | 12/2016 | Hairston | B29C 63/34 |
| 2018/0058614 A1 | 3/2018 | Anderson | |
| 2019/0376635 A1* | 12/2019 | Hairston | B29C 63/34 |
| 2020/0009802 A1* | 1/2020 | Hairston | B29C 63/26 |
| 2022/0099229 A1* | 3/2022 | Hairston | F16L 55/165 |

* cited by examiner

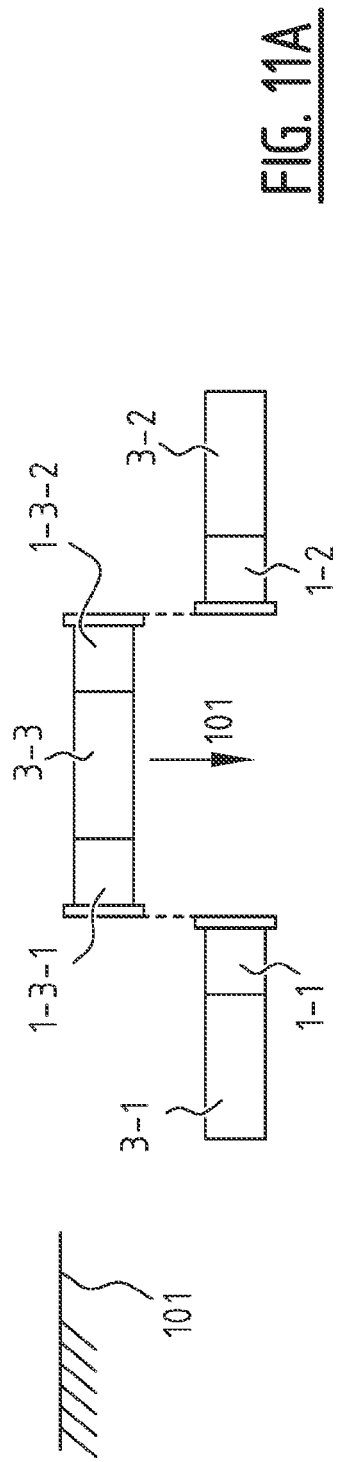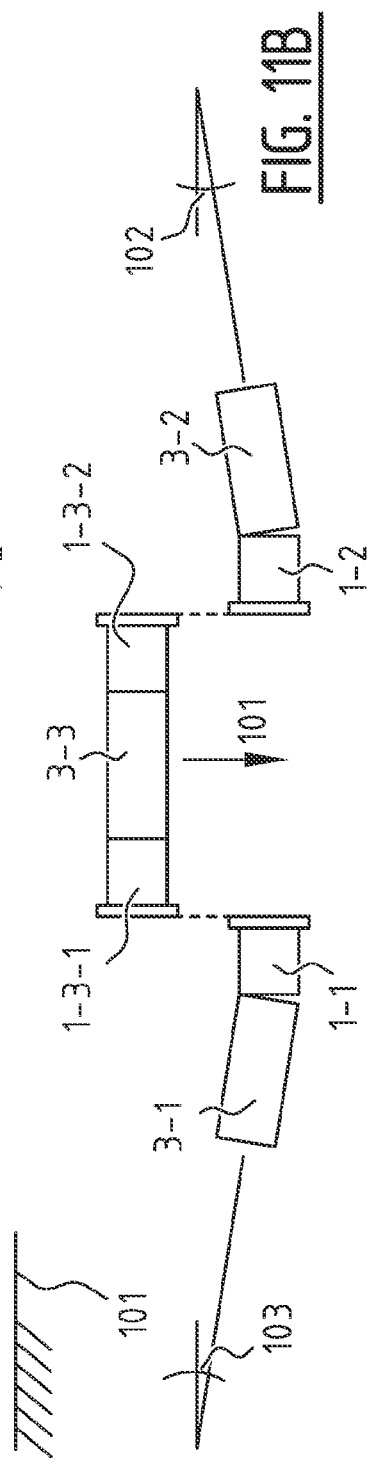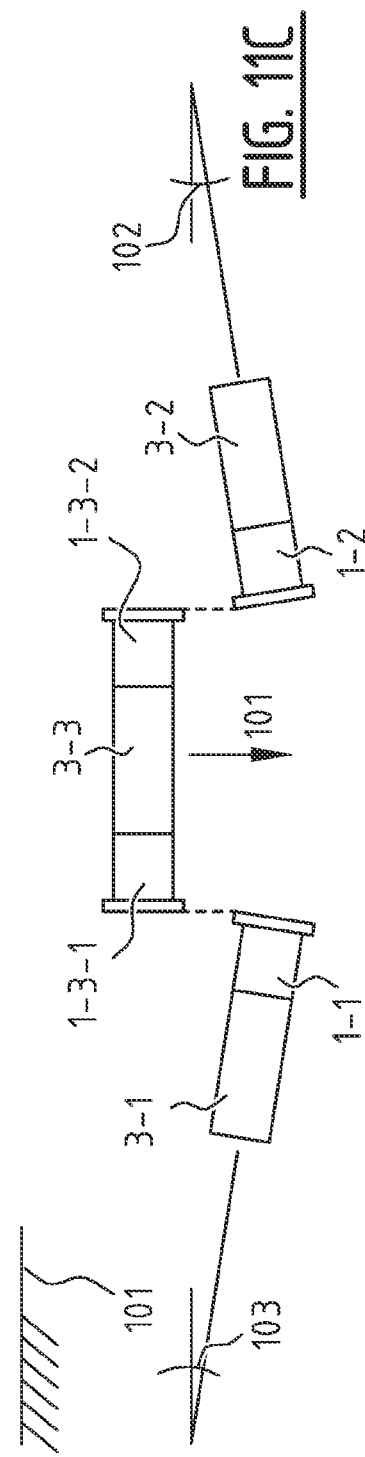

METHOD FOR REHABILITATING A PIPELINE WITH A LINER

This is a national stage application filed under 35 U.S.C. § 371 of pending international application PCT/NL2019/050732, filed Nov. 8, 2019, which claims priority to Netherlands Patent Application No. 2021972, filed Nov. 9, 2018, the entirety of which applications are hereby incorporated by reference herein.

FIELD OF THE INVENTION

The present invention relates to a method for rehabilitating a pipeline with a liner of reinforcing fibers and a curable resin composition. The invention uses an alignment device for a coupling member configured to connect a liner to a pipeline element.

BACKGROUND OF THE INVENTION

In-situ covering of an interior surface of a pipeline with a liner comprising reinforcing fibers and a curable resin composition is increasingly used in rehabilitating a damaged pipeline. A typical method involves providing a liner in the form of a resin-impregnated composite tube made of polyester, fibreglass cloth or a number of other materials suitable for resin impregnation, inverting the tubular liner and/or pulling the liner into the damaged host pipe. The liner may for instance be inverted using water or air pressure. Hot water, UV light, ambient cured or steam for instance may subsequently be used as medium to cure the resin and solidify the liner with the expectation of forming a relatively tight-fitting, preferably jointless and corrosion-resistant replacement pipe, also referred to as a CIPP (cured in place pipe).

CIPP liners may be installed into a damaged host pipe from an upstream access point, for instance provided by a manhole or other excavation. At such an access point, the host pipe provided with the liner needs to be connected to another host pipe provided with a liner, or eventually to an existing pipe (segment), or to other pipeline elements such as to a valve or to a pump for instance.

In order to connect a lined host pipe to another lined host pipe, the liner needs to be provided with a coupling member. This is typically done by welding steel flanges to an end of the host pipe and providing a fluid-tight connection between said steel flange and the liner, for instance with a internal rubber seal. This procedure however is time consuming, and needs to be executed by an expert worker to ensure a connection between the liner, the flange and the host pipe. Moreover, the process is not ideal as the connection relies in the remaining strength of the damaged host pipe; therefore, its long term performance cannot be guaranteed. In many cases, such a connection involves providing a connection that is substantially fluid-tight and has mechanical strength.

US 2014/0333067 A1 discloses a connecting piece for two pipe ends. The connecting piece includes a first alignment element adapted to be connected to one end of the receiving pipe and a second alignment element adapted to be connected to the connecting piece, the first and second elements providing abutting surfaces when the connecting piece is mounted against the receiving pipe end to axially align the receiving pipe and the connecting piece.

US 2018/058614 A1, US 2015/174706 A1 and U.S. Pat. No. 2,452,985 disclose similar devices.

WO 2018/139923 A1 discloses a method for repairing a pipeline with a liner in which a coupling piece is provided. The coupling piece is adapted to connect a liner to other pipeline elements and comprises reinforcing fibers and a resin composition that is substantially completely cured in a first part of the coupling piece. The coupling piece is axially aligned, but details are not disclosed.

It would be desirable to provide a more efficient and reliable method for rehabilitating a pipeline with a liner of reinforcing fibers and a curable resin composition. Another aim is to provide a reliable and substantially fluid-tight connection between the liner, and a pipeline element connected to it, over an extended working life of the rehabilitated pipeline.

SUMMARY OF THE INVENTION

According to the invention, there is provided a method in accordance with claim 1. The method for rehabilitating a pipeline with a liner of reinforcing fibers and a curable resin composition comprises:
  providing a coupling member configured to connect a liner to a pipeline element and comprising reinforcing fibers and a resin composition that is substantially fully cured in a first part of the coupling member;
  providing an alignment device comprising a first and a second alignment element;
  connecting the first alignment element to an end of the host pipe and the second alignment element to the coupling member to be able to axially align the host pipe and the coupling member by providing mating surfaces when the coupling member is provided against the host pipe end;
  providing a length of the liner through the host pipe;
  providing a length of the liner through the coupling member;
  bringing the coupling member towards the host pipe such that the second alignment element provided on the coupling member is provided against the first alignment element provided on the host pipe;
  attaching the coupling member to the end of the host pipe using the alignment elements;
  exposing the curable resin composition of the liner in a joining section of the liner;
  pressurizing the joining section of the liner that is received in the coupling member to bring it against an interior surface of a second part of the coupling member; and
  curing the curable resin composition of the liner to form a functional joint between the coupling member second part and the liner joining section.

The method provides a more efficient and accurate method for rehabilitating a pipeline with a liner.

The invented method steps may be executed in any different order, for instance according to different useful embodiments.

In one embodiment the method steps comprise
  providing the coupling member;
  providing the alignment device and connecting the first alignment element to an end of the host pipe and the second alignment element to the coupling member to axially align the host pipe and the coupling member by providing mating surfaces when the coupling member is provided against the end of the host pipe;
  bringing the coupling member towards the host pipe such that the second alignment element provided on the coupling member is provided against the first alignment element provided on the host pipe;

attaching the coupling member to the host pipe end using the alignment elements;
providing a length of the liner through the host pipe and through the coupling member attached to the host pipe;
detaching the coupling member from the host pipe to give access to the joining section of the liner;
exposing the curable resin composition of the liner in the joining section;
attaching the coupling member again to the host pipe end using the alignment elements;
pressurizing the joining section of the liner that is received in the coupling member to bring it against an interior surface of a second part of the coupling member; and
curing the curable resin composition of the liner to form a functional joint between the coupling member second part and the liner joining section.

In another embodiment the method steps comprise
providing the coupling member;
providing the alignment device and connecting the first alignment element to an end of the host pipe and the second alignment element to the coupling member to axially align the host pipe and the coupling member by providing mating surfaces when the coupling member is provided against the host pipe end;
providing a length of the liner through the host pipe and through the coupling member that is not yet attached to the host pipe;
exposing the curable resin composition of the liner in the joining section;
bringing the coupling member towards the host pipe such that the second alignment element provided on the coupling member is provided against the first alignment element provided on the host pipe;
attaching the coupling member to the host pipe end using the alignment elements;
pressurizing the joining section of the liner that is received in the coupling member to bring it against an interior surface of a second part of the coupling member; and
curing the curable resin composition of the liner to form a functional joint between the coupling member second part and the liner joining section.

In yet another embodiment the method steps comprise:
providing the coupling member;
providing the alignment device and connecting the first alignment element to an end of the host pipe and the second alignment element to the coupling member to axially align the host pipe and the coupling member by providing mating surfaces when the coupling member is provided against the end of the host pipe;
providing a length of the liner through the host pipe only;
exposing the curable resin composition of the liner in the joining section;
providing an end of the liner inside the coupling member and bringing the coupling member towards the host pipe such that the second alignment element provided on the coupling member is provided against the first alignment element provided on the host pipe;
attaching the coupling member to the host pipe end using the alignment elements;
pressurizing the joining section of the liner that is received in the coupling member to bring it against an interior surface of a second part of the coupling member; and
curing the curable resin composition of the liner to form a functional joint between the coupling member second part and the liner joining section.

In yet another embodiment, the method steps comprise:
providing the coupling member;
providing the alignment device and connecting the first alignment element to end of the host pipe and the second alignment element to the coupling member to axially align the host pipe and the coupling member by providing mating surfaces when the coupling member is provided against the host pipe end;
providing a length of the liner through the host pipe only;
providing an end of the liner inside the coupling member and bringing the coupling member towards the host pipe such that the second alignment element provided on the coupling member is provided against the first alignment element provided on the host pipe;
exposing the curable resin composition of the liner in the joining section;
attaching the coupling member to the host pipe end using the alignment elements;
pressurizing the joining section of the liner that is received in the coupling member to bring it against an interior surface of a second part of the coupling member; and
curing the curable resin composition of the liner to form a functional joint between the coupling member second part and the liner joining section.

A typical liner used in pipe rehabilitation comprises reinforcing fibers and a curable resin composition, and a protective foil that inter alia may prevent premature cure, for instance in embodiments wherein the resin composition is photo-curable (UV-curable), Exposing the curable resin composition of the liner in the joining section in such embodiments comprise removing the protective foil form the liner at least in the joining section.

The present invention relates to a method for rehabilitating a pipeline with a liner of reinforcing fibers and a curable resin composition. The pipeline segment to be rehabilitated is known to the person skilled in the art as the host pipe, as it hosts the liner used to rehabilitate it. A host pipe may be any type of pipeline component, or a combination of them, such as, but not limited to, a pipe section, a pipe section that is not fluid-tight, a pipe section the remaining strength of which is not sufficient and therefore needs to be rehabilitated preventively, connectors for side branches in the pipe line system, valves, T-pieces or similar.

The coupling member used in the invented method is adapted to connect to a liner end, and then connect said liner to other pipeline components. A pipeline component may be components such as, but not limited to, the liner of an already rehabilitated host pipe, an intermediate pipe segment, an pipe segment that does not need to be rehabilitated yet, a connector for side branches in the pipe line system, valves, T-pieces, blind flanges or the like. In case of an intermediate pipe segment, another side of this segment may connect to another liner segment, but also to a pipe segment in good shape that did not require relining.

According to an embodiment of the invention, a method is provided wherein the first alignment element comprises a plate or plate section a mating surface whereof extends from an outer surface of the host pipe end, when connected thereto, in a plane under a non-zero acute angle with the central axis of the host pipe, and preferably in a plane substantially perpendicular to a central axis of the host pipe.

Another embodiment of the invention relates to a method wherein the first alignment element is removably attached to the host pipe end.

Yet another embodiment of the invention provides a method wherein connecting a first alignment element to an end of the host pipe comprises axially aligning the first alignment element and the host pipe end using an aligning tool aid.

In a method according to yet another embodiment, the second alignment element comprises a plate or plate section a mating surface whereof extends from an outside surface of the coupling member end, when connected thereto, in a plane under a non-zero acute angle with the central axis of the coupling member, and preferably in a plane substantially perpendicular to the central axis of the coupling member.

Another embodiment provides a method wherein the second alignment element is removably attached to the coupling member end.

Yet another embodiment of the invention is provided by a method wherein the coupling member is provided against the host pipe end, and the first and second alignment elements are connected to axially align the host pipe end and the coupling member by providing mating surfaces.

The method may in principle be carried out by using any coupling member suitable for the purpose. A method according to a preferred embodiment is characterized in that the second part of the coupling member comprises dry reinforcing fibers, and the liner curable resin composition is accepted by the dry reinforcing fibers of the second part in the step of bringing the coupling member towards the host pipe and/or of pressurizing the joining section of the liner that is received in the coupling member to bring it against an interior surface of a second part of the coupling member.

Another useful embodiment comprises a method wherein the second part of the coupling member is provided with a curable resin composition before the step of providing an alignment device comprising a first and a second alignment element. The coupling member may be cured in place (in situ) and may generate a joint with the impregnated liner when the last one is cured. Indeed, the coupling member has at least two parts: a first, solid (cured) part that provides the shape to the coupling member, and a second part, for instance provided at an inner surface of the coupling member, which facilitates structural joining with the liner. After curing the liner—preferably in situ—together with the coupling member, a strong joint is obtained between both. This yields a liner provided with an integrated coupling member.

Although not limited in shape, suitable examples of the invented coupling member comprise a coupling, flange, elbow, tee section, and the like. An embodiment of the invention provides a coupling member comprising a flange for coupling to another component of the pipeline system.

According to the invention, the first thermosetting resin composition is substantially fully cured. A substantially fully cured first thermosetting resin composition can be obtained in accordance with a curing cycle recommended by the supplier of the first thermosetting resin composition, or in accordance with a curing cycle that produces a similar result, A post-cure may be applicable.

With the wording 'substantial' or 'substantially' is meant in the context of the present application at least 70% of the indicated property, more preferably at least 80%, even more preferably at least 90%, and most preferably at least 95% of the indicated property.

The volumetric percentage of the first and second parts of the coupling member relative to the coupling member's total volume may be chosen within a wide range. It is possible for instance that the second part of the coupling member comprises as much as 90% by volume of the coupling member. In a preferred embodiment of the composite coupling member, the second part of the coupling member comprises at most 60% by volume of the coupling member, more preferable at most 50% by volume of the coupling member, even more preferably at most 40% by volume of the coupling member, even more preferably at most 30% by volume of the coupling member, even more preferably at most 20% by volume of the coupling member, and most preferably at most 10% by volume of the coupling member. The first part of the coupling member then preferably occupies the remaining volume. In other embodiments, the second part of the coupling member comprises at least 5% by volume of the coupling member, and more preferably at least 10% by volume of the coupling member.

In an embodiment of the composite coupling member according to the invention, the first part is continuous across the element and provides dimensional stability to the element and supports the second part or parts. With a continuous first part is meant a first part that extends across the element uninterruptedly. Such a first part may however locally comprise holes etc., as long as a line can be found that runs in the first part from one end of the element to an opposed end of the element in an uninterrupted fashion.

The cured first part of the coupling member in this embodiment provides shape stability to the element, so that it can be transported and handled, even with the dry second part(s) or a second part that is provided with a substantially uncured resin composition.

A particularly useful embodiment is provided by a coupling member comprising a circumferential body of which an outer circumferential shell forms the first part, and an inner circumferential shell forms the second part, or vice versa. Such an embodiment of the invention provides a composite element having a thickness, the second part extending over part of said thickness. This embodiment provides a bondable surface on one side of the element and a solid substantially fully cured surface on an opposite side of the element.

The thermosetting resin compositions of a coupling member in accordance with the invention may be chosen within a wide range of available thermosetting resin compositions. In an embodiment of the invention, a coupling member is provided wherein the thermosetting resin composition comprises an epoxy, unsaturated polyester, phenolic, polyurethane, or bismaleimide resin/hardener mixture, or combinations thereof, such as two-component systems based on thermosetting urethane. An epoxy and/or unsaturated polyester resin/hardener mixture is particularly preferred.

A UV-curable resin composition is preferred. In this respect, an embodiment of the method wherein the second part of the coupling member is covered by a UV-resistant foil, and the foil is removed, is particularly preferred.

It has advantages to provide an embodiment of the method wherein the curable resin composition of the second part of the coupling element comprises a composition that is substantially similar to the composition of the curable resin composition of the liner, or comprises the curable resin composition of the liner.

The method of the invention is in particular advantageous according to embodiments wherein the liner comprises a UV-curable resin composition, and a UV-resistant coating layer, and the coating layer is removed in the joining section of the liner, preferably before the step of curing the resin composition, more preferably before providing a length of the liner through the coupling member. The UV-resistant coating layer is required in this embodiment to protect the UV-curable resin composition from curing prematurely under the influence of for instance ambient light. The coating layer may further be instrumental in protecting the liner from getting damaged while providing the liner through the host pipe and coupling member. To adhesively or chemically connect the coupling element to the liner, the coating layer needs to be removed.

The invention prevents alignment loss when removing the coupling member from the host pipe. Removal of the coating layer is very difficult when the liner joining section is inside the coupling member. Moving the liner after removing the coating such that the joining section is positioned inside the coupling member is often not possible. Therefore, having an alignment and clamping system wherein the coupling member can be attached and detached any number of times without losing alignment is desirable. In this way, removing of the coating may conveniently be carried out by using a knife or other cutting instrument and the coupling member can be moved to the joining section afterwards. The invention, and the present embodiment wherein the coating layer is removed before the step of curing the resin composition, more preferably before the step of providing a length of the liner the coupling member, provides a solution to this problem.

It should be noted that an optional UV-resistant foil provided to protect a UV-curable resin impregnated second part of the coupling member needs also be removed in order to adhesively or chemically connect the coupling element to the liner, as already referred to above.

The composite coupling member according to the invention may comprise other components, such as metal inserts, foam or honeycomb core, thermoplastic or thermosetting films, bonded thereto by other methods than according to the invention, or any other material that can be incorporated as an integral part of such a coupling member.

Providing a length of liner through the host pipe and through the coupling member may be performed by a number of methods. A preferred method according to an embodiment provides a length of the liner through the host pipe and through the coupling member by pulling in the liner. However, the invention may also use other (less preferred) methods, such as a method wherein providing a length of the liner through the host pipe and through the coupling member is carried out by inverting the liner. In the latter embodiment, the step of providing a length of the liner through the host pipe and through the coupling member is preferably carried out after the step of bringing the coupling member towards the host pipe such that the second alignment element provided on the coupling member is provided (and secured) against the first alignment element provided on the host pipe.

One may envision a method in which a coupling member is directly aligned and secured to the host-pipe end. Such a method, however, is rather difficult given the fact that coupling members may be large and heavy and require lifting machines for handling them. The invention provides a solution to this problem, as the first element is aligned and secured to the host pipe first. Then, the heavy coupling member can be attached to the host pipe without requiring additional alignment.

In a situation in which a host pipe that has been provided with a liner and a coupling member at one end thereof, or alternatively at both or even more ends thereof, needs to be connected to another coupling member, provided on the liner of another host pipe, an embodiment wherein a part of the cured liner that is exposed outside the host pipe and the associated coupling member is removed, is particularly preferred.

An associated embodiment then provides a method, further comprising the step of coupling the coupling member to an intermediate pipe segment and coupling the other end of mentioned intermediate pipe segment to another coupling member provided on the liner of another host pipe. Although any suitable means of connection may be used, a convenient method according to an embodiment is characterized in that the coupling comprises bolting a flange portion of the coupling member to a flange portion of the other coupling member.

The invention also concerns an alignment device for a coupling member configured to connect a liner end to a pipeline element. The device is advantageously used in the invented method and comprises a first alignment element configured to be connected to an end of a host pipe and a second alignment element configured to be connected to the coupling member. The first and second elements provide mating surfaces when the coupling member is provided against the host pipe end to axially align the host pipe and the coupling member.

A preferred embodiment of the invention provides a device wherein the first alignment element comprises a plate or plate section of which a mating surface extends from an outer surface of the host pipe end, when connected thereto, in a plane under a non-zero acute angle with the central axis of the host pipe.

Another preferred device according to an embodiment is characterized in that the mating surface of the plate or plate section extends substantially perpendicular to the central axis of the host pipe.

A useful embodiment provides a device wherein the first alignment element comprises means for removably attaching it to the host pipe end.

Other useful embodiments of the invention relate to devices wherein the first alignment element comprises means for adjusting its alignment after it has been attached to the pipeline element end, and more preferably, wherein the means for adjusting its alignment after the first alignment element has been attached to the pipeline element end comprises threaded rods and nuts that act on its plate or plate section.

Yet another preferred embodiment of the invention provides a device wherein the second alignment element comprises a plate or plate section of which a mating surface extends from an outside surface of the coupling member, when connected thereto, in a plane under a non-zero acute angle with the central axis of the coupling member.

Another embodiment relates to a device wherein the mating surface of the plate or plate section extends substantially perpendicular to the central axis of the coupling member.

A useful embodiment provides a device wherein the second alignment element comprises means for removably attaching it to the coupling member end.

Forces exerted on the coupling member may be substantial during providing a liner through the coupling member and the host pipe. A preferred embodiment in this respect provides a device wherein the first and second alignment elements comprise connection means for their mating surfaces in order to axially align the host pipe end and the coupling member when the coupling member is provided against the host pipe end.

The embodiments of the invention described in the present patent application may be combined in any possible combination of these embodiments, and each embodiment may individually form the subject-matter of a divisional patent application.

BRIEF DESCRIPTION OF THE FIGURES

The invention will now be described in more detail by way of example, without however being limited thereto and with reference to the accompanying figures in which:

FIGS. 11A-11C schematically show configurations that may exist between host pipes, coupling elements and a connection pipe according to embodiments of the invention; and finally FIGS. 12A-12D schematically show embodiments of an alignment device in accordance with the invention.

DESCRIPTION OF PREFERRED EMBODIMENTS

Figure 1:
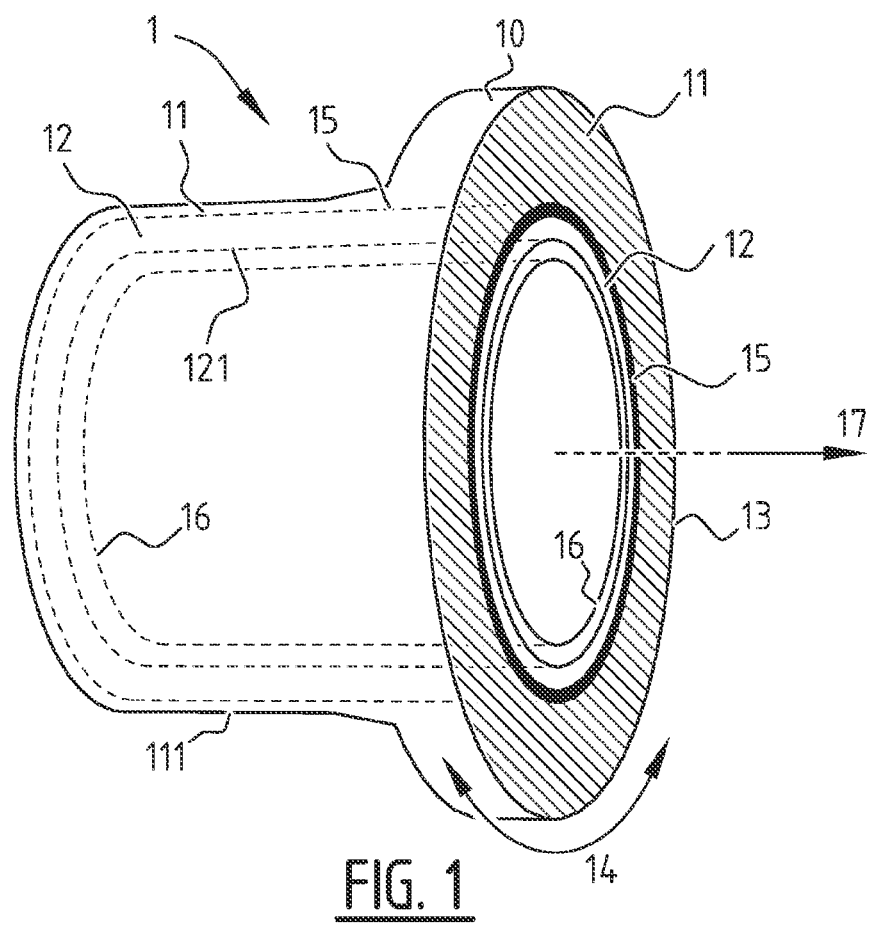
FIG. 1 schematically illustrates a perspective view of a coupling member in accordance with an embodiment of the invention.
Figure 2:
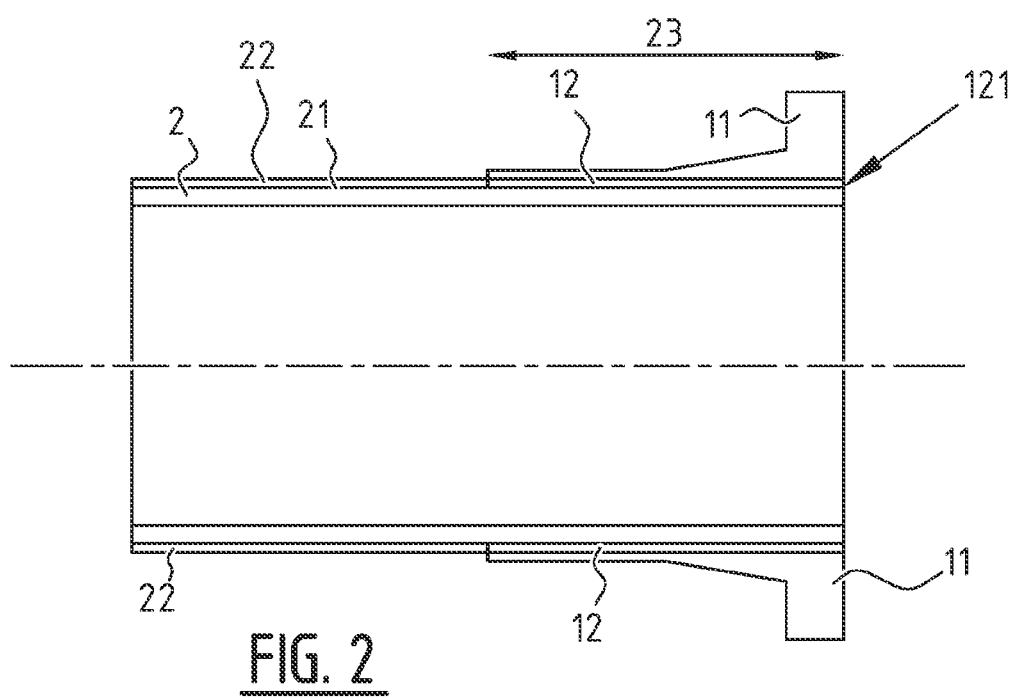
FIG. 2 schematically illustrates a cross-section of the coupling member of FIG. 1 in joint assembly with a liner.

Referring to FIG. 1, a perspective view of a coupling member 1 according to an embodiment of the invention is shown. The coupling member 1 is made of a composite material, comprising reinforcing fibers and a resin composition, for instance glass fiber-reinforced unsaturated polyester, and comprises a first part 11 of reinforcing fibers and a substantially fully cured resin composition. A second part 12 of the coupling member 1 comprises dry reinforcing fibers that form a bondable surface. This second part 12 may be substantially free of resin composition in a coupling member 1 as such, i.e. as produced. The coupling member 1 comprises a circumferential body of which an outer circumferential shell forms the first part 11, and an inner circumferential shell forms the second part 12. Both circumferential shells of the coupling member 1 extend over the substantially complete circumference 13 of the coupling member 1 in a circumferential direction 14. An inner surface 121 of the second part 12 is available for contacting an outer surface 21 of a liner 2 (FIG. 2). An interface layer 15 of the coupling member 1 in between surfaces of the first part 11 and the second part 12 structurally connects the first 11 and second part 12. This interface layer 15 can for instance be formed by resin that originates from the first part 11 before curing and partially impregnates the second part 12 of dry reinforcement fibers.

FIG. 2 shows the coupling element 1 in a connected state with a liner 2 for rehabilitating a damaged host pipe (section). The liner 2 typically comprises a composite article of reinforcing fibers and a resin composition, for instance a felt impregnated with an unsaturated polyester resin. An outer surface 21 of the liner is contacted with an inner surface 121 of the coupling member 1. The second part 12 of the element 1 can accept a curable resin composition that optionally originates from the uncured or partly cured liner 2 to form a functional joint between the coupling member 1 and at least a part of the liner 2. It is also possible to provide the second part 12 with a separate curable resin composition for this purpose. In an alternative embodiment, the second part 12 of the coupling member 1 is provided with a curable resin composition before the coupling member 1 is actually used in the invented method, for instance before providing a length of the liner 2 through the host pipe 3 and through the coupling member 1 to expose a joining section of the liner outside the host pipe 3. Providing the second part 12 of the coupling member 1 with a substantially uncured resin composition may be done on-site but is preferably done off-site.

The invention is particularly useful for rehabilitating a pipeline with a liner 2 that is based on a UV-curable resin composition, known per se. In such case the liner 2 is provided with an additional UV-resistant coating layer 22 provided onto the outer surface 21 of the liner 2. As shown in FIG. 2, the coating layer 22 needs to be removed from the outer surface 21 of the liner 2 at least along the length of the joining section 23 of the liner 2, which joining section 23 is configured to be bonded to the second part 12 of the coupling element 1.

In order to provide an unproblematic bonding between the liner 2 and the coupling member 1 in the joining section 23 of the liner 2, it may be advantageous to provide the second part 12 of the coupling member 1 with a curable resin composition that is compatible with, more preferably substantially similar, and most preferably identical to the composition of the curable resin composition of the liner. In such an embodiment, at least the outer surface 121 of the second part 12 of the coupling member 1 may be covered with a UV-resistant foil 16, as schematically shown in FIG. 1. For convenience, the foil 16 may also at least partly cover an outside surface 111 of the first part 11 of the coupling member 1. As is apparent from FIG. 2, the foil 16 also needs to be removed from the outer surface 121 of the coupling element 1 at least along the length of the joining section 23 with the liner 2 in order to be able to bond to the liner 2.

The coupling member 1 is advantageously used in a method for rehabilitating a (damaged) host pipe. The steps of the invented method for rehabilitating a host pipe 3 with a liner 2 will be illustrated below with reference to FIGS. 3-4.

Figure 4:
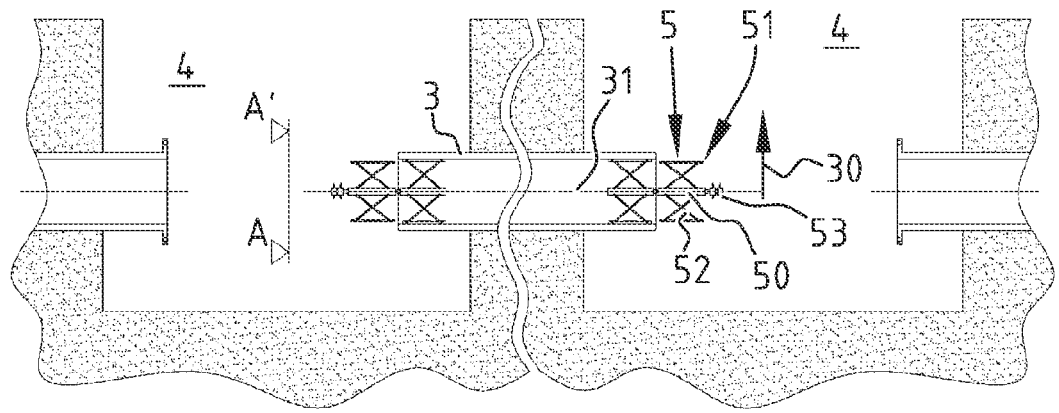
Figure 4A:
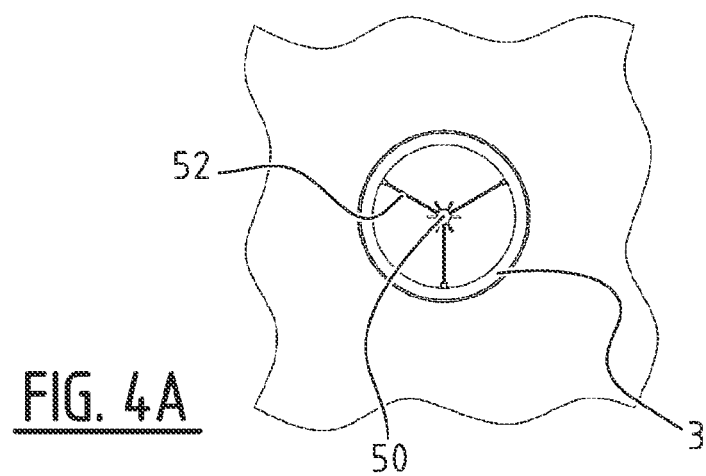
FIG. 4A schematically provides a front view of an embodiment of the aligning aid tool as used in the method in accordance with the invention; while FIG. 5 schematically shows a side view of an aligned coupling member in accordance with an embodiment of the invention.

A first step typically comprises excavating one or more holes 4 in the bottom that makes access to the host pipe 3 possible. The host pipe 3 to be rehabilitated is then trimmed at one or two ends of the host pipe 3. In a first step, shown in FIG. 4, an aligning tool aid 5 is brought into the host pipe 3. The aligning tool aid 5 comprises a central shall 50 to which an expanding mechanism 51 is connected. The mechanism 51 comprises shearing members 52 that can be moved in a radial direction 30 of the host pipe by a turning knob 53 such that the mechanism 51 can be fixed inside the host pipe 3. In a fixed position, a part of the mechanism 51 extends beyond and end face and out of the host pipe 3, as shown in FIG. 4. As shown in the front view of FIG. 4A, the members 52 in the fixed positon of the aligning tool aid 5 within the host pipe 3 push against an inner surface of the host pipe 3 such that the central shaft 50 is parallel to the axial direction 31 of the host pipe 3 and in fact coincides with the central axis of the host pipe 3.

Figure 3:
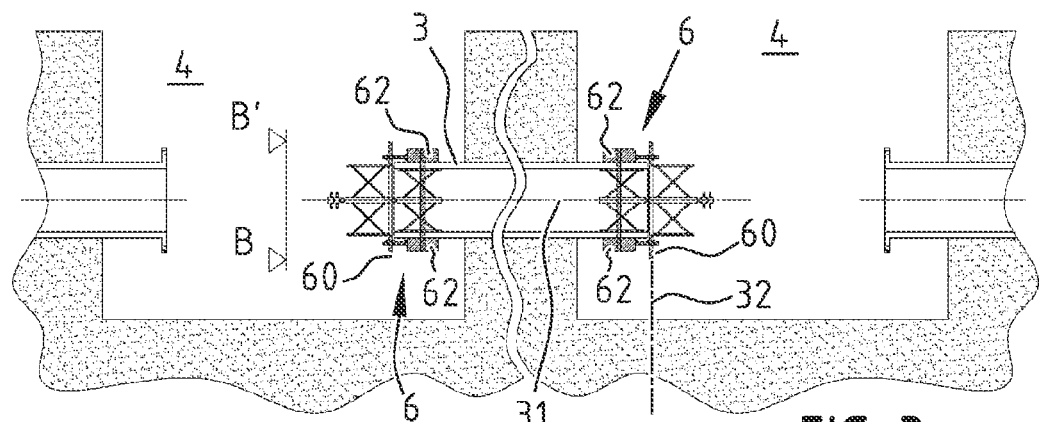
FIGS. 3 and 4 schematically illustrate a number of method steps according to several embodiments of the invention.
Figure 3A:
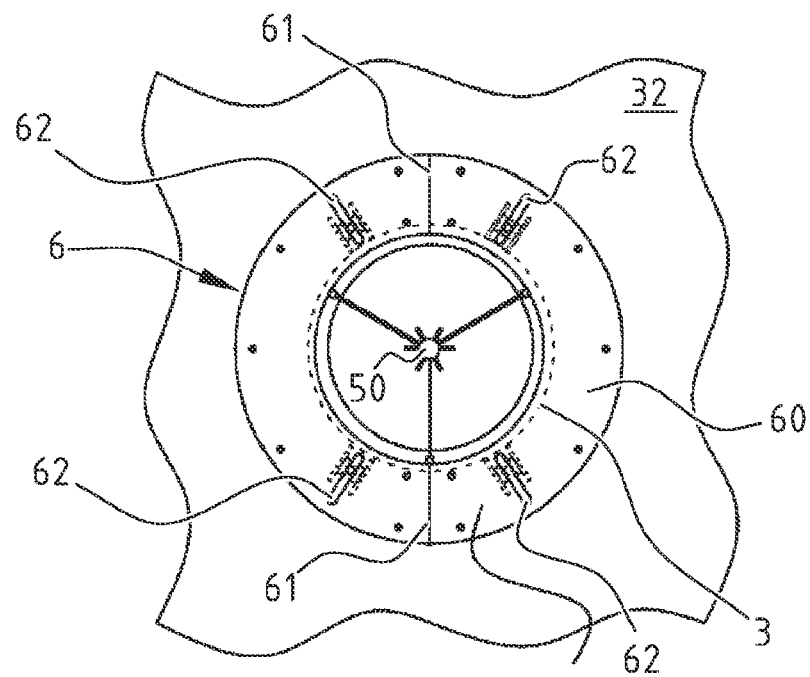
FIGS. 3A and 3B schematically provide a front view of embodiments of the first alignment element as used in the method in accordance with the invention.
Figure 3B:
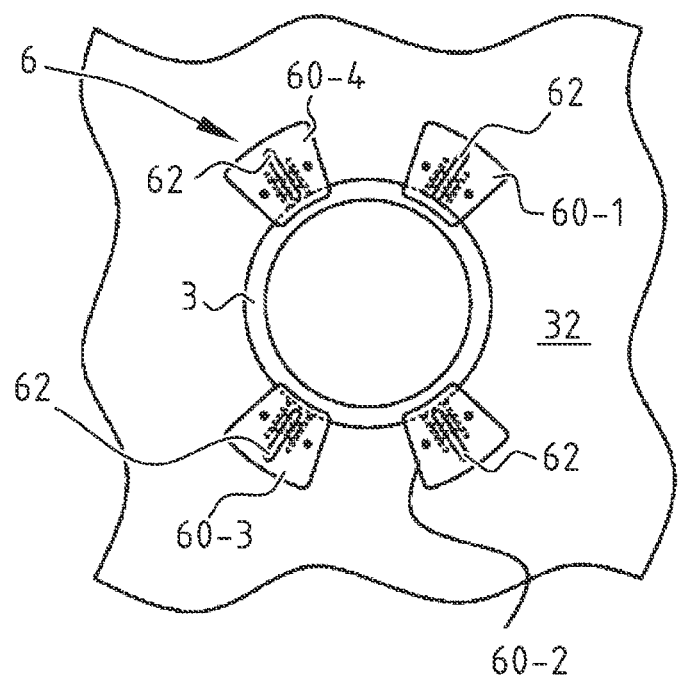

The aligning tool aid 5 is now used to connect a first alignment element 6 to an end of the host pipe 3, as is schematically shown in FIG. 3. The first alignment element 6 in the embodiment shown comprises a plate 60 that extends from an outer surface of the host pipe end 3 in a plane 32 substantially perpendicular to the central axis 31 of the host pipe 3 (or parallel to the radial direction 30 of the host pipe 3). As shown in the front view of FIG. 3A, the plate 60 covers a complete circumferential area of the host pipe 3. The plate 60 may be dividable in two parts through dividing lines 61. Another embodiment of the first alignment element 6 comprises a number of circumferentially aligned plate sections 60-1 to 60-4. This embodiment allows accommodating host pipes 3 with differing diameters.

The first alignment element 6 is removably attached to an outer surface of the end of host pipe 3 by a number of clamps 62, which may also act as aligning tools. Y connecting the first alignment element 6, and in particular the plate 60 (or plate sections (60-1, . . . , 60-4) to the aligning tool aid 5, the first alignment element 6 and the host pipe 3 are axially aligned.

Figure 5:
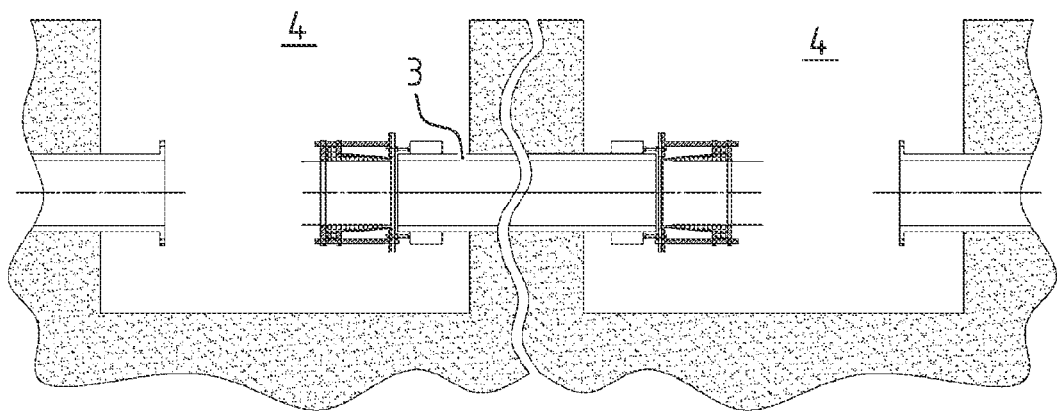
FIG. 5A schematically provides a detailed side view of the aligned coupling member shown in the embodiment of FIG. 5.
Figure 5A:
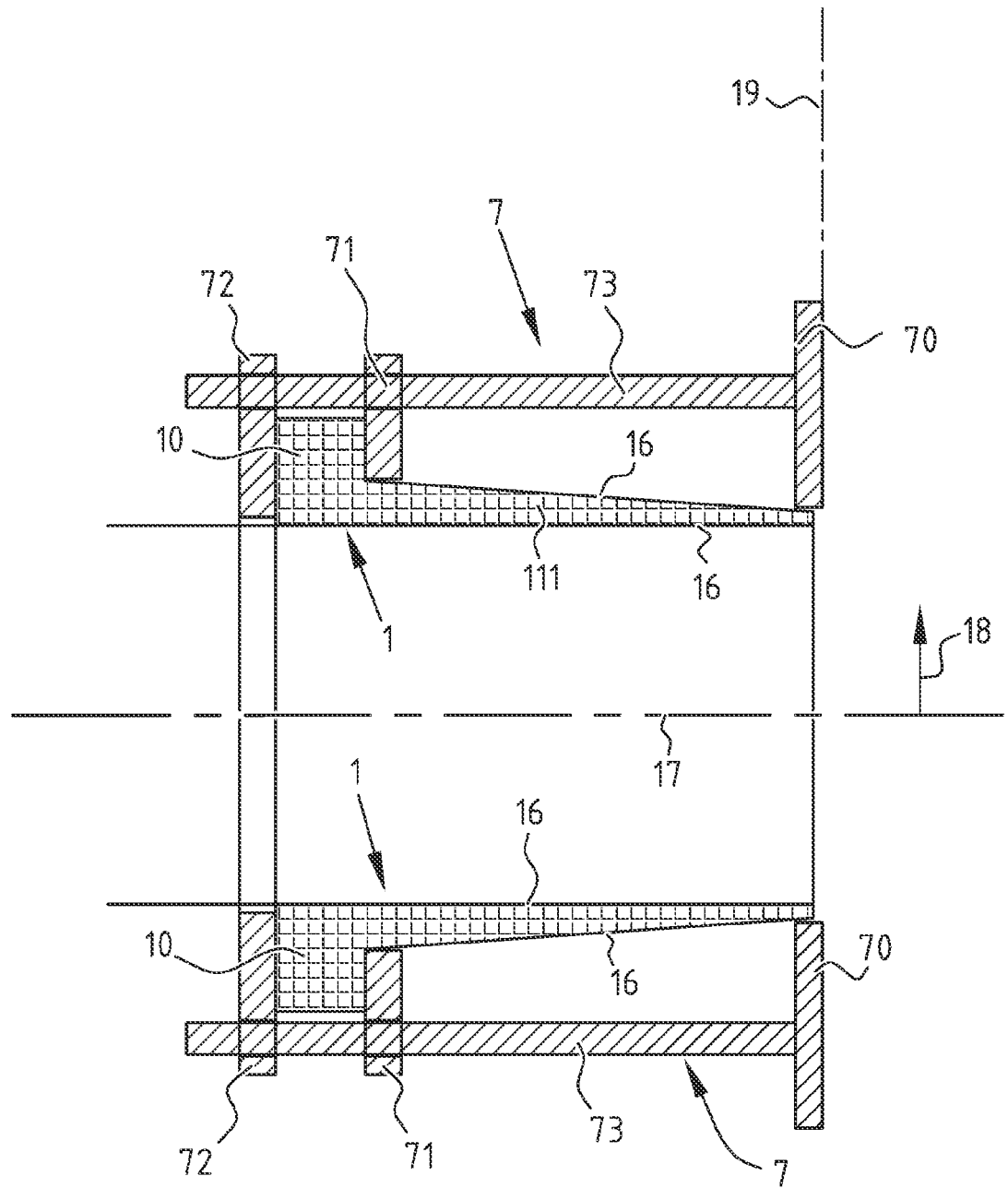

As best shown in FIG. 5A, a second alignment element 7 is removably attached to an end of the coupling member 1. The second alignment element 7 comprises a front plate 70 (or alternatively a number of plate sections) that extends from an outside surface 111 of the coupling member 1 end in a radial direction 18 of the coupling member 1 and in plane 19 substantially perpendicular to a central axis 17 of the coupling member 1. The front plate 70 is rigidly attached through rods 73 to an assembly of clamping flanges (71, 72) that may be clamped around an end flange 10 of the coupling member 1. The coupling member 1 is provided with a UV-resistant foil 16 to prevent premature cure of the UV-curable resin composition that may have been provided in the second part 12 of the coupling member 1.

The coupling member 1 may, in an embodiment shown in FIG. 5, then be brought towards the host pipe 3 such that the second alignment element 7 provided on the coupling member 1 is provided against the first alignment element 6 provided on the host pipe 3. The host pipe 3 and the coupling member 1 are now aligned axially since mating surfaces of the plates 60 and 70 contact each other and are secured against each other, for instance by bolting, when the coupling member 1 is provided against the host pipe 3 end.

Figure 6:
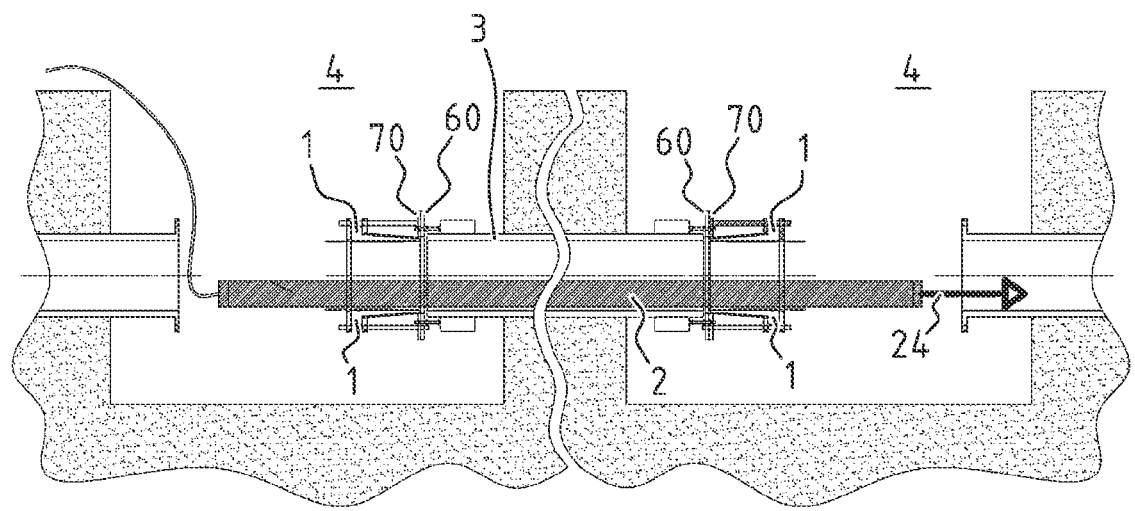
FIGS. 6 to 9 schematically show several method steps in accordance with an embodiment according to the invention.
Figure 7:
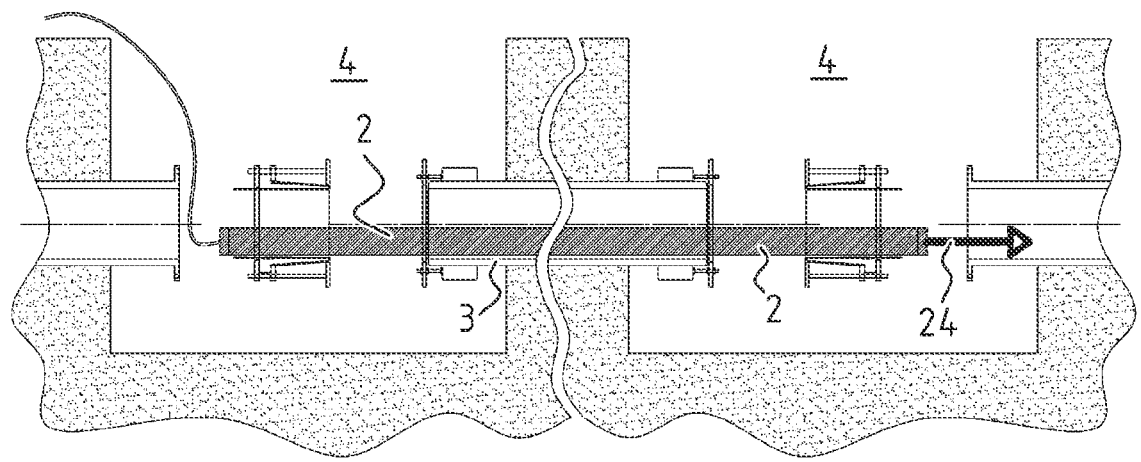

As shown in FIG. 6, a liner 2 is then provided and pulled in the direction 24 through the coupling member 1 and through the host pipe 3. The coupling member 1 needs not be aligned and secured against the first alignment element 6 of the host pipe 3 in this process. It may be possible to pull the liner 2 through the coupling member 1 and the host pipe 3 while the coupling member 1 is not secured to the host pipe 3, as shown in FIG. 7.

Figure 8:
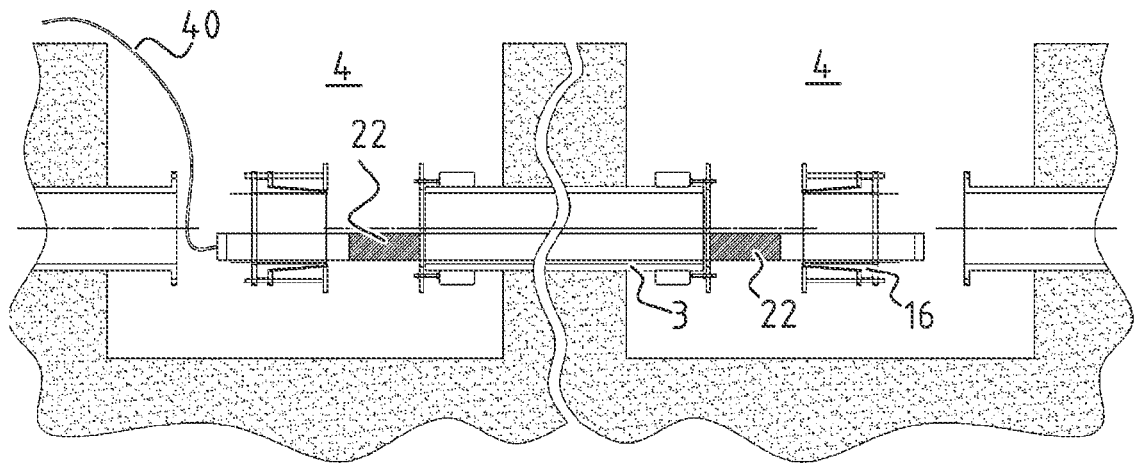

As shown in FIG. 8, it may also be possible to pull the liner 2 in the direction 24 through the coupling member 1 and through the host pipe 3, and then loosen and retract the coupling member 1 from the end of the host pipe 3, for instance in order to be able to remove the foil 16 and/or a UV-resistant coating layer 22 from the liner.

After having pulled the liner through, the joining section 23 of the liner 2 is received in the coupling member 1.

To remove a coating layer 22 from the liner 2, the coupling member 1 is temporarily retracted from the host pipe 3 ends to expose a joining section 23 of the liner 2 outside the host pipe 3. The coating layer 22 may then at least at the joining section 23 be removed, for instance by a cutting tool. This method step is shown in FIG. 8.

Figure 9:
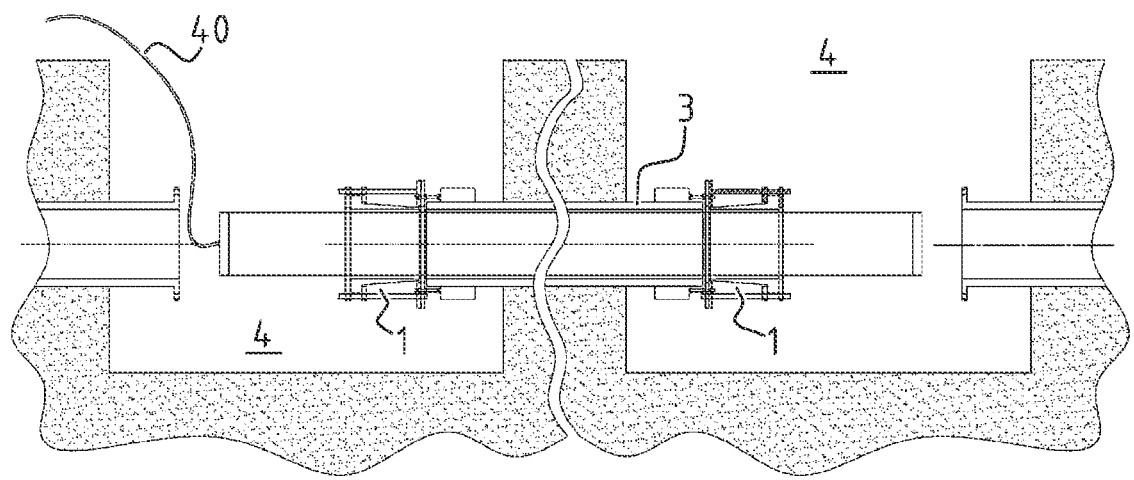

Referring to FIG. 9, the coupling members 1 are then again moved towards the first alignment elements 6 secured onto the host pipe 3 ends, and connected to the first alignment elements 6. In this method step, an optional UV-resistant foil 16 may also be removed.

The liner 2 is then pressurized with suitable pressuring means 40 from the inside such that a good contact between the outer surface 21 of the liner 2 and an inner surface 121 of the coupling member 1 is achieved, as shown in FIG. 9. The resin composition of the liner 2, and optionally the resin composition of the second part 12 of the coupling member 1, is then cured together with the coupling member 1 to form a strong joint between both. Hot water, UV light, ambient cure or steam may be used to perform the curing depending on the resin composition of the liner 2 and the coupling member 1.

UV curing is particularly preferred in the context of the present invention.

Once cured, a part of the cured liner 2 that is exposed outside the host pipe 3 and the associated coupling member 1 may be removed, in order to make it possible to couple the coupling member 1 to another coupling member provided on another host pipe 3 using and intermediate pipe segment.

The end face flange portion 10 of the coupling member 1 may be used for connection to another pipeline element, for instance an intermediate pipe segment used to connect to another coupling member 1, provided on another host pipe 3. The coupling then comprises bolting the flange portion 10 of the coupling member 1 to a flange portion of the intermediate pipe segment. The first and second alignment elements 6 and 7 are then preferably removed from the host pipe 3 end and the coupling member 1 respectively.

Figure 10A:
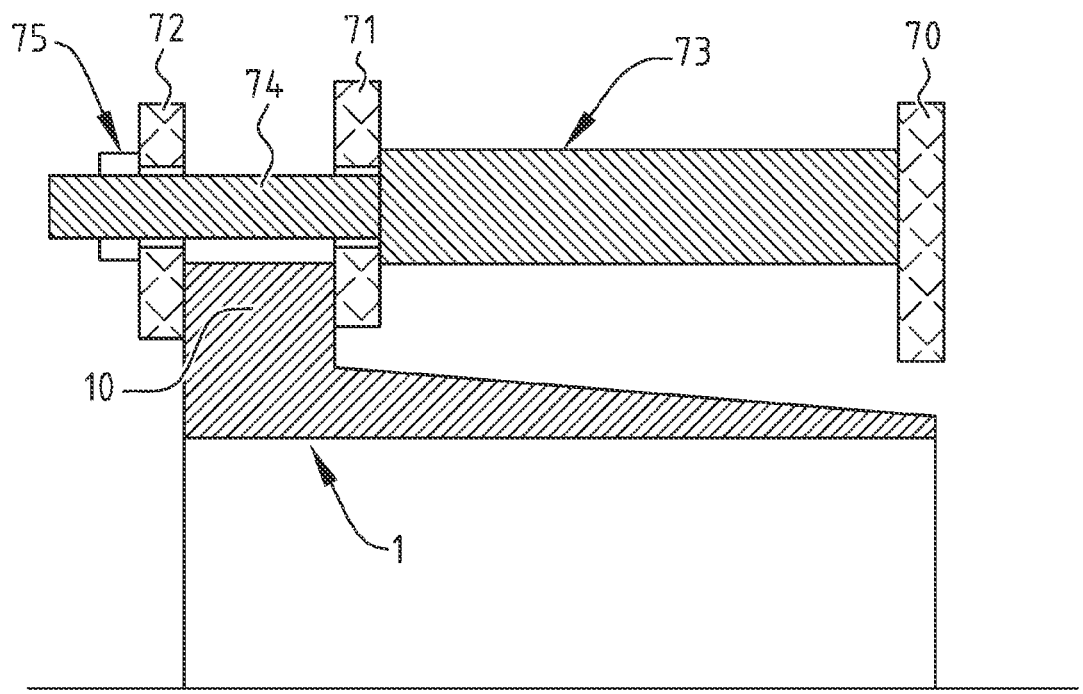
FIGS. 10A and 10B schematically show an alignment device in accordance with several embodiments of the invention.
Figure 10B:
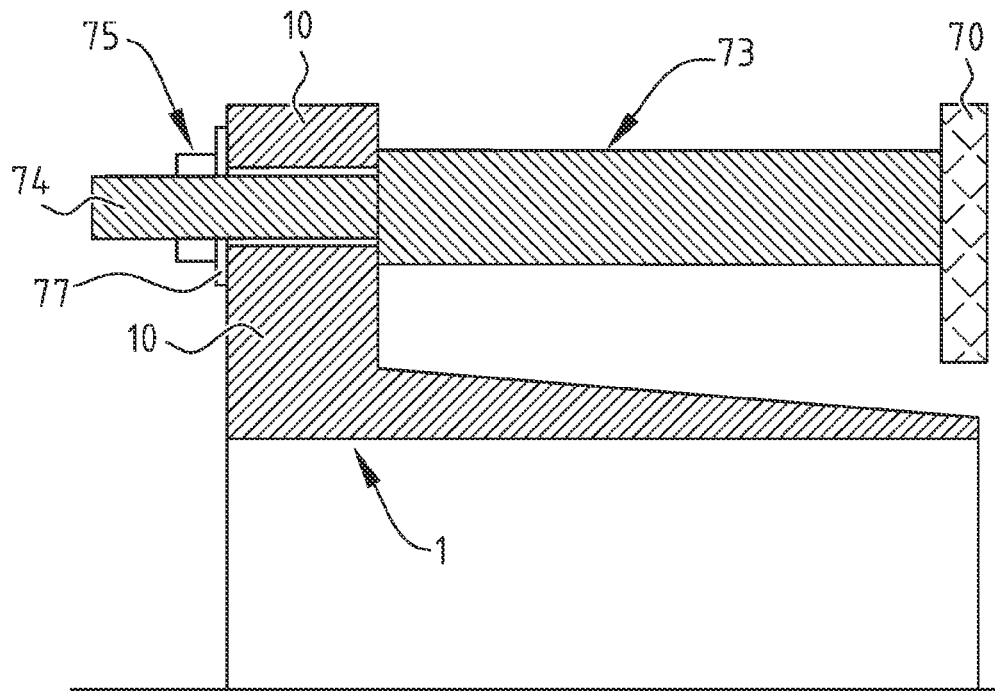

Referring to FIGS. 10A and 10B, two embodiments are shown of the second alignment element 7 that is provided on the coupling member 1. The embodiment shown in FIG. 10A comprises an end plate 70 that is connected to a backing flange 71 by a rod 73. A clamping flange 72 may be screwed onto screw thread member 74 and secured against the end flange 10 of the coupling member 1 by a nut 75. The flanges (71, 72) provide a clamping around the end flange 10 of the coupling member 1, and firmly secure the second alignment element 7 to the coupling member 1.

The embodiment shown in FIG. 10B comprises an end plate 70 that is connected to a screw thread member 74 by a rod 73. The screw thread member 74 is provided in a hole 76 of the end flange 10 of the coupling member 1. A nut 75 is screwed onto the thread member 74 and secured against the end flange 10 of the coupling member 1 with a washer 77 in between. This configuration also provides a secure connection of the coupling member land the second alignment element 7.

Referring to FIG. 11A, two host pipes (3-1 and 3-2) extend substantially horizontal, i.e. about parallel to ground level 100. Coupling members 1-1 and 1-2 are provided at ends of the host pipes 3-1 and 3-2 and aligned by the above-described alignment device (6, 7) (not shown in the figures for clarity) such that their central axis extends substantially coaxial with the central axis of said host pipes 3-1 and 3-2. The liners (not shown in the figures for clarity) are provided inside host pipes (3-1 and 3-2) and substantially cured to form a functional joint with the coupling members (1-1 and 1-2), An intermediate pipe segment 3-3 is used to connect the two liners inside the host pipes (3-1 and 3-2). Flange members 1-3-1 and 1-3-2 are provided at both ends of the intermediate pipe segment 3-3 and aligned such that their central axis extends substantially coaxial with the central axis of said intermediate pipe segment 3-3. The end flange members 1-3-1 and 1-3-2 may be integrally formed with the intermediate pipe segment 3-3 or may be applied as separate members. The pipe segment 3-3 is then brought downward (arrow 101) to bring it in between host pipes 3-1 and 3-2, and connect the end flanges of the aligned end flange members and coupling members 1 to each other.

Referring to FIG. 11C, two host pipes (3-1 and 3-2) do not extend substantially horizontal, and in fact their center axis extends under non-zero acute angles (102, 103) with ground level 100. Coupling members 1-1 and 1-2 are provided at ends of the host pipes 3-1 and 3-2 and aligned by the above-described alignment device (6, 7) (not shown in the figures for clarity) such that their central axis extends substantially coaxial with the central axis of said host pipes 3-1 and 3-2, The end flange members 1-3-1 and 1-3-2 provided at both ends of intermediate pipe segment 3-3 are aligned such that their central axis extends substantially coaxial with the central axis of said intermediate pipe segment 3-3, It is rather difficult to install the intermediate pipe segment 3-3 in this configuration since the end flanges of the end flange members and the coupling members 1 are not mutually aligned. The configuration shown in FIG. 11B is less optimal, as it is difficult to install and to obtain a water tight connection.

The method shown in FIG. 11B provides a solution for this problem. Referring to FIG. 11C, two host pipes (3-1 and 3-2) do not extend substantially horizontal, and in fact their center axis extends under a non-zero acute angle (102, 103) with ground level 100. Coupling members 1-1 and 1-2 are provided at ends of the host pipes 3-1 and 3-2 in this embodiment such that one of the first or second alignment elements provides a mating surface that extends in a plane under a non-zero acute angle with the central axis of the host pipes 3-1 and 3-2. The alignment device (6, 7) in this embodiment makes it possible that the central axis of the coupling elements (1-1 and 1-2) does not extend substantially coaxial with the central axis of said host pipes 3-1 and 3-2. In this manner, the end flange 10 of the coupling members (1-1 and 1-2) may be aligned substantially vertical to ground level 100, such that it may mate with end flanges of the end flange members 1-3-1 and 1-3-2 provided on the intermediate pipe segment 3-3. This allows the intermediate pipe segment 3-3 to be easily installed.

Figure 12A:
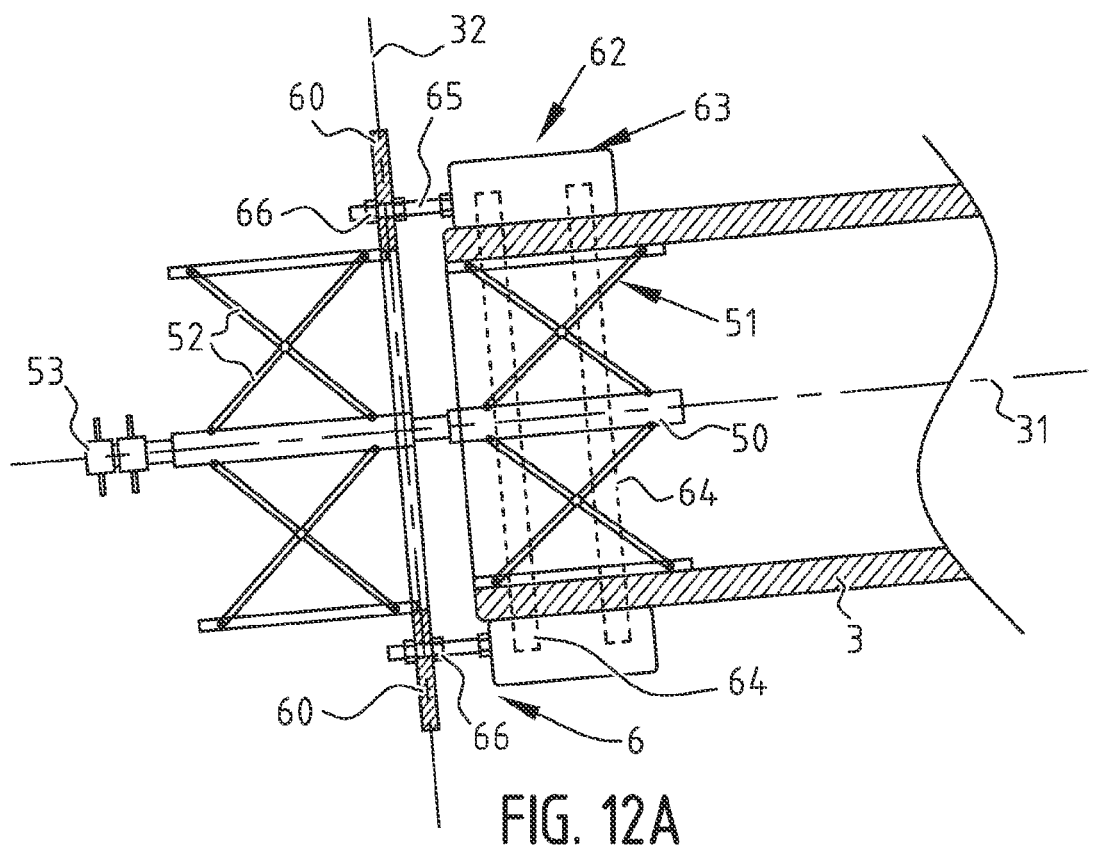

In FIG. 12A is schematically shown how a first alignment element 6 may be secured onto the a host pipe. An aligning tool aid 5 may be used to accomplish this whereby the aligning tool aid 5 is positioned within the host pipe 3 against an inner surface of the host pipe 3 such that the central shaft 50 is parallel to the axial direction 31 of the host pipe 3 and in fact coincides with the central axis of the host pipe 3. As also shown in FIG. 12D, the first alignment element 6 in the embodiment comprises a plate 60 that extends from an outer surface of the host pipe end 3 in a plane 32 which may be substantially perpendicular to the central axis 31 of the host pipe. The first alignment element may further comprise a plurality of clamps 62, comprising blocks 63 (for instance 3 or more) that are firmly attached to the host pipe 3 with straps 64. Each block 63 is provided with a threaded rod 65 that extends outwardly about parallel to the axial direction 31. The plate 60 (or plates 60-1, 60-2, . . . , 60-4) is secured to the blocks 63 by aligning holes in the pate 60 with the threaded rods 65 and securing the plate onto the threaded rods 65 with nuts 66.

Figure 12B:
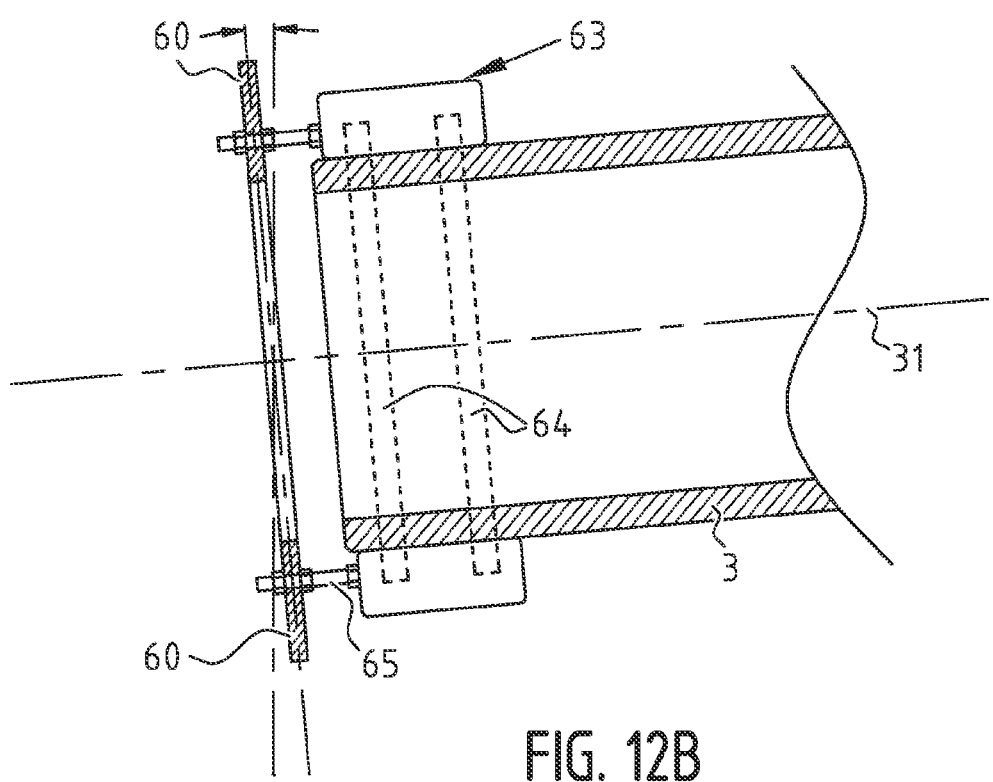

Referring to the situation of FIG. 12B, the host pipe 3 is shown to deviate from a horizontal alignment. Therefore, is some situations it may be preferable to adjust the alignment such that the plate 60 and a coupling piece flange face mounted thereto is aligned in a vertical plane instead of co-axially with the host-pipe 3. This can be achieved by adjusting the nuts 66 that clamp the plate 60 onto the threaded rods 65.

Figure 12C:
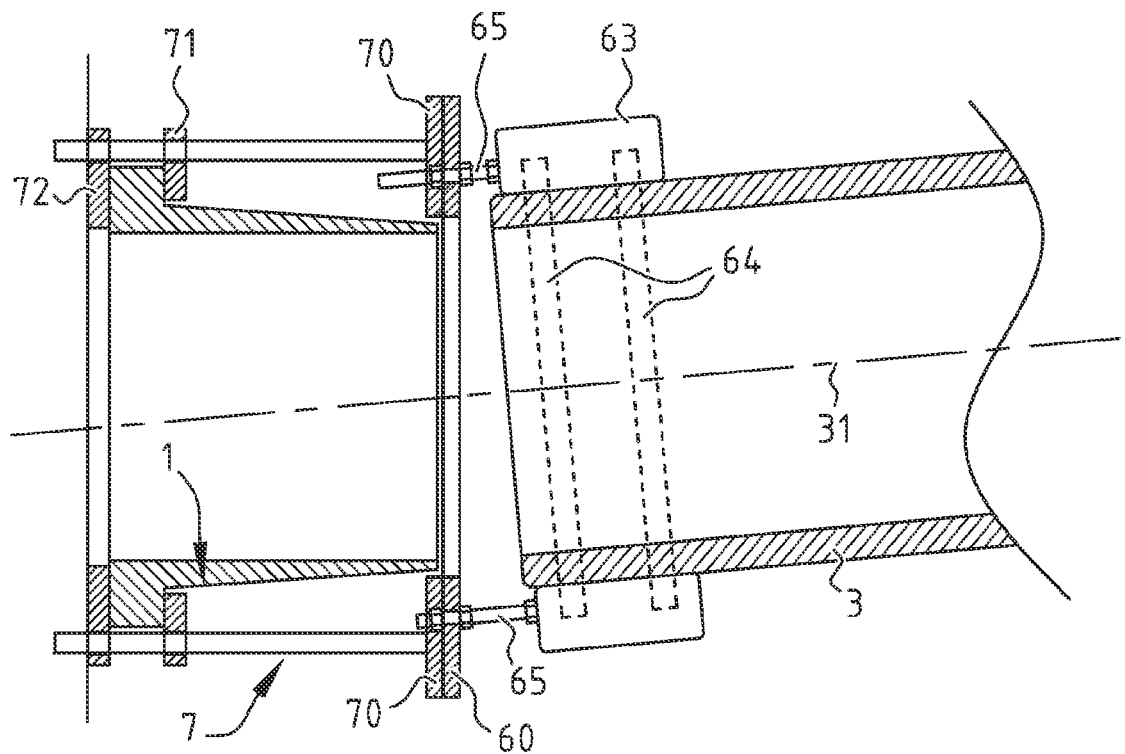
Figure 12D:
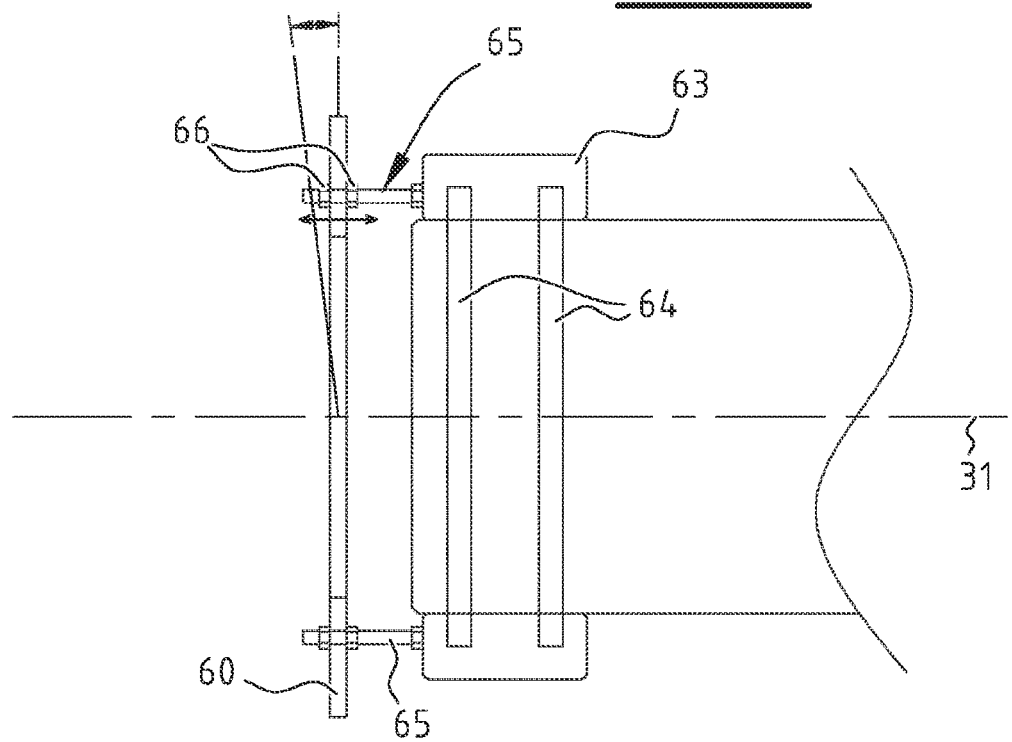

Referring to FIG. 12C, the second aligning element 7 is secured onto the plate 60. As shown, the coupling piece 1 is substantially centred but its flange face 10 now extends in a substantially vertical plane.

The above description of several embodiments should not be construed to limit the invention, the scope of which is determined by the wording of the appended claims.

The invention claimed is:

1. A method for rehabilitating a pipeline with a liner of reinforcing fibers and a curable resin composition, the method comprising:
providing a coupling member configured to connect a liner to other pipeline elements and comprising reinforcing fibers and a curable resin composition that is substantially fully cured in a first part of the coupling member;
providing an alignment device comprising a first and a second alignment element;
connecting the first alignment element to an end of a host pipe and the second alignment element to the coupling member to axially align the host pipe and the coupling member by providing mating surfaces when the coupling member is provided against the host pipe end;
bringing the coupling member towards the host pipe such that the second alignment element provided on the coupling member is provided against the first alignment element provided on the host pipe;
attaching the coupling member to the host pipe end by using the alignment elements;
providing a length of the liner through the host pipe;
providing a length of the liner through the coupling member;
exposing the curable resin composition of the liner in a joining section of the liner;
pressurizing a joining section of the liner that is received in the coupling member to bring it against an interior surface of a second part of the coupling member; and
curing the curable resin composition of the liner to form a functional joint between the coupling member second part and the liner joining section.

2. The method according to claim 1, wherein the first alignment element comprises a plate or plate section, a mating surface thereof extends from an outer surface of the host pipe end, when connected thereto, in a plane under a non-zero acute angle with the central axis of the host.

3. The method according to claim 1, wherein the first alignment element is removably attached to the host pipe end.

4. The method according to claim 1, wherein connecting a first alignment element to an end of the host pipe comprises axially aligning the first alignment element and the host pipe end using an aligning tool aid.

5. The method according to claim 1, wherein the second alignment element comprises a plate or plate section, a mating surface thereof extends from an outside surface of the coupling member, when connected thereto, in a plane under a non-zero acute angle with the central axis of the coupling member.

6. The method according to claim 1, wherein the second alignment element is removably attached to the coupling member.

7. The method according to claim 1, wherein the coupling member is provided against the host pipe end, and the first and second alignment elements are connected to axially align the host pipe end and the coupling member by providing mating surfaces.

8. The method according to claim 1, wherein the second part of the coupling member comprises dry reinforcing fibers, and the liner curable resin composition is accepted by the dry reinforcing fibers of the second part in the step of pressurizing the joining section of the liner and/or curing the curable resin composition of the liner.

9. The method according to claim 1, wherein the second part of the coupling member is provided with a curable resin composition before the step of curing the curable resin composition of the liner to form a functional joint between the coupling member second part and the liner joining section.

10. The method according to claim 1, wherein the second part of the coupling member is covered by a UV-resistant foil, and the foil is removed before the step of pressurizing the joining section of the liner.

11. The method according to claim 9, wherein the curable resin composition comprises a composition that is substantially similar to the composition of the curable resin composition of the liner, or comprises the curable resin composition of the liner.

12. The method according to claim 1, wherein the liner comprises a UV-curable resin composition, and a UV-resistant coating layer, and the coating layer is removed in the joining section of the liner.

13. The method according to claim 12, wherein the coating layer is removed before the step of curing the resin composition of the liner, and preferably before the step of pressurizing the joining section of the liner.

14. The method according to claim 1, wherein providing a length of the liner through the host pipe and through the coupling member is carried out by pulling in the liner.

15. The method according to claim 1, wherein providing a length of the liner through the host pipe and through the coupling member is carried out by inverting the liner.

16. The method according to claim 1, wherein a part of the cured liner that is exposed outside the host pipe and the associated coupling member is removed.

17. The method according to claim 1, further comprising the step of coupling the coupling member to another pipeline component.

18. The method according to claim 17, wherein the coupling comprises bolting a flange portion of the coupling member to a flange portion of the another pipeline component.

19. The method according to claim 1, further comprising the consecutive steps of:
providing the alignment device and connecting the first alignment element to an end of the host pipe and the second alignment element to the coupling member to axially align the host pipe and the coupling member by providing mating surfaces when the coupling member is provided against the host pipe end;
bringing the coupling member towards the host pipe such that the second alignment element provided on the coupling member is provided against the first alignment element provided on the host pipe;
attaching the coupling member to the host pipe end;
providing a length of the liner through the host pipe and through the coupling member attached to the host pipe;
detaching the coupling member from the host pipe to give access to the joining section of the liner;
exposing the curable resin composition of the liner in the joining section;
reattaching the coupling member to the host pipe end;
pressurizing the joining section of the liner that is received in the coupling member to bring it against an interior surface of a second part of the coupling member; and
curing the curable resin composition of the liner to form a functional joint between the coupling member second part and the liner joining section.

20. The method according to claim 1, further comprising the consecutive steps of:
providing the alignment device and connecting the first alignment element to an end of the host pipe and the second alignment element to the coupling member to axially align the host pipe and the coupling member by providing mating surfaces when the coupling member is provided against the host pipe end;
providing a length of the liner through the host pipe and through the coupling member that is not yet attached to the host pipe;
exposing the curable resin composition of the liner in the joining section;
bringing the coupling member towards the host pipe such that the second alignment element provided on the coupling member is provided against the first alignment element provided on the host pipe;
attaching the coupling member to the host pipe end;
pressurizing the joining section of the liner that is received in the coupling member to bring it against an interior surface of a second part of the coupling member; and
curing the curable resin composition of the liner to form a functional joint between the coupling member second part and the liner joining section.

21. The method according to claim 1, the method further comprising the consecutive steps of:
providing the alignment device and connecting the first alignment element to an end of the host pipe and the second alignment element to the coupling member to axially align the host pipe and the coupling member by providing mating surfaces when the coupling member is provided against the host pipe end;
providing a length of the liner through the host pipe only;
exposing the curable resin composition of the liner in the joining section;
providing an end of the liner inside the coupling member and bringing the coupling member towards the host pipe such that the second alignment element provided on the coupling member is provided against the first alignment element provided on the host pipe;
attaching the coupling member to the host pipe end;
pressurizing the joining section of the liner that is received in the coupling member to bring it against an interior surface of a second part of the coupling member; and
curing the curable resin composition of the liner to form a functional joint between the coupling member second part and the liner joining section.

22. The method according to claim 1, the method further comprising the consecutive steps of:
- providing the alignment device and connecting the first alignment element to an end of the host pipe and the second alignment element to the coupling member to axially align the host pipe and the coupling member by providing mating surfaces when the coupling member is provided against the host pipe end;
- providing a length of the liner at least through the host pipe only;
- providing an end of the liner inside the coupling member;
- exposing the curable resin composition of the liner in the joining section;
- bringing the coupling member towards the host pipe such that the second alignment element provided on the coupling member is provided against the first alignment element provided on the host pipe;
- attaching the coupling member to the host pipe end;
- pressurizing the joining section of the liner that is received in the coupling member to bring it against an interior surface of a second part of the coupling member; and
- curing the curable resin composition of the liner to form a functional joint between the coupling member second part and the liner joining section.

* * * * *